(12) United States Patent
Babcock et al.

(10) Patent No.: US 12,295,300 B2
(45) Date of Patent: May 13, 2025

(54) CARBON DIOXIDE UNDERWATER DELIVERY DEVICE AND SUPPLEMENTATION SYSTEM

(71) Applicants: Glen Babcock, Missoula, MT (US); Wendy Babcock Garrett, Missoula, MT (US)

(72) Inventors: Glen Babcock, Missoula, MT (US); Wendy Babcock Garrett, Missoula, MT (US)

( * ) Notice: Subject to any disclaimer, the term of this patent is extended or adjusted under 35 U.S.C. 154(b) by 0 days.

(21) Appl. No.: 18/513,202

(22) Filed: Nov. 17, 2023

(65) Prior Publication Data

US 2024/0081313 A1    Mar. 14, 2024

Related U.S. Application Data

(60) Continuation of application No. 17/039,465, filed on Sep. 30, 2020, now Pat. No. 11,839,204, which is a
(Continued)

(51) Int. Cl.

| | | |
|---|---|---|
| *A01M 1/02* | (2006.01) | |
| *A01G 7/02* | (2006.01) | |
| *A01K 61/85* | (2017.01) | |
| *A01K 63/04* | (2006.01) | |
| *A01M 1/10* | (2006.01) | |
| *A01N 63/30* | (2020.01) | |

(52) U.S. Cl.
CPC .............. *A01G 7/02* (2013.01); *A01K 61/85* (2017.01); *A01K 63/042* (2013.01); *A01M 1/023* (2013.01); *A01M 1/106* (2013.01); *A01N 63/30* (2020.01); *Y02A 50/30* (2018.01)

(58) Field of Classification Search
CPC ....... A01M 1/023; A01M 1/106; A01K 61/85; A01K 63/042; A01G 18/66; A01G 7/02; A01G 18/64; A01G 9/18
See application file for complete search history.

(56) References Cited

U.S. PATENT DOCUMENTS

| | | |
|---|---|---|
| 3,577,678 A | 5/1971 | Burton |
| 3,673,733 A | 7/1972 | Merton |
| (Continued) | | |

FOREIGN PATENT DOCUMENTS

WO PCT/US2014-046574 A2    1/2015

*Primary Examiner* — Trinh T Nguyen
(74) *Attorney, Agent, or Firm* — Sarah J. Rhoades

(57) ABSTRACT

A delivery device and system to supplement $CO_2$ in an underwater environment without the need for electricity or the use of compressed $CO_2$. The device consists of a container containing a biological organism such as mycelium and including an exit portal for $CO_2$ to enter the underwater environment. The device may also incorporate a separation device to delay and control the flow of $CO_2$. The system requires the device to be held in place through a securing point in the underwater environment. The minimum requirements for the device are described, but in certain instances it will be preferably used with a double-bag or an outer shell housing to protect or aesthetically conceal the placement underwater. The use of this device and system to supplement carbon dioxide in water will span many industries and applications. It will assist with mosquito trapping. It will also supplement $CO_2$ in underwater growing environments.

14 Claims, 18 Drawing Sheets

Related U.S. Application Data division of application No. 15/954,438, filed on Apr. 16, 2018, now Pat. No. 10,827,736, which is a continuation of application No. PCT/US2018/027824, filed on Apr. 16, 2018.

(60) Provisional application No. 62/485,772, filed on Apr. 14, 2017.

(56) References Cited

U.S. PATENT DOCUMENTS

| | | |
|---|---|---|
| 3,810,327 A | 5/1974 | Giansante |
| 4,063,383 A | 12/1977 | Green |
| 5,036,618 A | 8/1991 | Mori et al. |
| 5,123,203 A | 6/1992 | HIromoto |
| 5,230,430 A | 7/1993 | Kidder |
| 6,346,141 B1 | 2/2002 | Nuckols et al. |
| 6,490,824 B1 | 12/2002 | Maekawa et al. |
| 6,748,696 B1 | 6/2004 | Davidson |
| 9,386,751 B2 | 7/2016 | Creekmore |
| 9,622,421 B2 | 4/2017 | Babcock et al. |
| 9,750,196 B2 | 9/2017 | Babcock et al. |
| 9,854,745 B2 | 1/2018 | Babcock et al. |
| 9,867,337 B2 | 1/2018 | Babcock et al. |
| 2004/0213823 A1 | 10/2004 | Stamets |
| 2008/0155790 A1 | 7/2008 | Hsu |
| 2008/0216397 A1 | 9/2008 | Busby et al. |
| 2008/0313800 A1 | 12/2008 | Matsuda |
| 2011/0143426 A1 | 6/2011 | Busby et al. |
| 2012/0023709 A1 | 2/2012 | Hsu |
| 2015/0000188 A1 | 1/2015 | Shirahane et al. |
| 2015/0250103 A1 | 9/2015 | Babcock et al. |
| 2015/0373920 A1 | 12/2015 | Babcock et al. |
| 2017/0181381 A1 | 6/2017 | Babcock et al. |
| 2017/0202153 A1 | 7/2017 | Babcock et al. |

FIG. 18

```
102 — [A first clear plastic bag with filter]          [A second clear plastic bag with filter] — 101
           ↓                                                    ↓
    [Cut off the bottom seal]              [Cut off the bottom seal and make long line shorter than first bag]
           ↓                                                    ↓
         [Place second shorter bag inside of first bag with filters facing opposite
          directions, pleats aligned and bottom ends flush to one another]
                                    ↓
103 — [Heat Seal the two bags together at the bottom edge]
                                    ↓
         [Fill inner bag partially with substrate]
                                    ↓
         [Steam sterilize at 250 degrees Fahrenheit for 1 hour]
                                    ↓
                                 [Cool]
                                    ↓
         [Inoculate substrate in inner bag with sterilized pure cultured organism]
                                    ↓
104 — [Heat seal top of inner bag above filter]
                                    ↓
105 — [Heat seal top of outer bag above filter and above top seal of inner]  →  [Rest 72 hours]
                                                                                      ↓
                                                                              [Attach securing device]
```

CARBON DIOXIDE UNDERWATER DELIVERY DEVICE AND SUPPLEMENTATION SYSTEM

CROSS-REFERENCE TO RELATED APPLICATIONS

The present application is a divisional continuation of Ser. No. 17/039,465 filed on Sep. 30, 2020, which application is currently pending, and thus claims priority under 35 U.S.C. § 119(e) and also 35 U.S.C. § 21 to U.S. provisional patent application No. 62/485,772 entitled "Carbon Dioxide Underwater Delivery Device and Supplementation System" filed on Apr. 14, 2017, U.S. utility application Ser. No. 15/954,438 entitled "Carbon Dioxide Underwater Delivery Device and Supplementation System" filed Apr. 16, 2018, and PCT application number PCT/US2018/027824 filed on Apr. 16, 2018 also entitled "Carbon Dioxide Underwater Delivery Device and Supplementation System". The entire disclosure of this patent application is hereby incorporated into this application disclosure by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

This invention relates to carbon dioxide supplementation in water environments.

2. Description of the Related Art

It is known that insects such as mosquitos are attracted to carbon dioxide (abbreviated herein as $CO_2$) exhaled by humans and animals. It is also well known that mosquitos and other insects spread disease between animals. In recent years the diseases of concern include West Nile virus and Zika Virus both of which are transmitted to humans by mosquitos. To control the spread of these viruses, humans have sought to control populations of the insects. In some instances, municipalities have sought to eliminate any excess standing water which is known to serve as the breeding ground for mosquitos. More aggressive measures are beginning to be used where water reservoirs are actually used to attract the insects to come and lay their eggs. Once the eggs are in place these areas are treated in a manner to destroy the eggs. In order to attract the insects to the desired reservoirs where destruction of the offspring will ensue, researchers are seeking ways to make the reservoirs most attractive to the insects. Because mosquitos are attracted to carbon dioxide, the increased output of carbon dioxide in those reservoirs will attract mosquitos. The problem is how to enhance carbon dioxide output from those reservoirs. The only solutions available today include the use of propane burners to produce $CO_2$. $CO_2$ produced by sucrose (pure table sugar) fermented by yeast is another attractant that is used to lure mosquitos towards a trap. Both of these options have drawbacks. The propane burner is expensive, potentially dangerous due to fire risk and is not an environmentally sound choice. Propane must also be continually purchased throughout the mosquito season. Fermented attractants only work well on a small scale and continuously must be changed every 2 weeks throughout the mosquito season and are simply not practical for the scale needed to address the current disease control demands.

The primary way to provide $CO_2$ for aquatic plants in aquariums has been the use of regulators and compressed $CO_2$ in cylinders. This is very expensive and can lead to problems if the regulator fails. For general information about environmental conditions for aquariums, this background incorporates the information at the web site http://www.myaquariumclub.com/water-chemistry-parameters-gh-and-kh-8815.html by this reference.

BRIEF SUMMARY OF THE INVENTION

The present invention is a device to deliver $CO_2$ in an underwater environment without the need for electricity or the use of compressed $CO_2$. The device comprises a container holding a respirating organism together with a food source and growth substrate. For example, the present invention could employ the mycelial mass, mycelia with a food substrate, or bacteria with similar properties to mycelia prepared with methods such as those described in the inventors' family of patent applications that includes U.S. Pat. No. 9,720,196 B2. The device further comprises a portal for $CO_2$ to exit the device and enter the underwater environment and such portal may comprise nothing more than a microporous breather patch or may comprise additional components in certain embodiments. In one embodiment, the device consists of one double-lined, double-filtered bag with a filter on each bag liner, the filters preferably facing in opposite directions. If two standalone bags are joined to create this embodiment, then three seals will be required to seal the device: The first seal closes both bags on the bottom so that they share a mutual bottom seal; the second seal closes the top of the inner liner; and, the third seal closes the top of the outer lining of the bag. The device further comprises a separation apparatus such as an external sealing clamp in order to provide selective sealing and to selectively delay and control the flow of $CO_2$. The device also comprises a securing component to hold the carbon dioxide supplementation system in place in the underwater environment. The device can be used alone or in conjunction with an outer shell to house the container. Such an external shell segregates or disguises the device for protection and/or aesthetic purposes. In embodiments incorporating an external shell, also called a hard-shell case, the underwater carbon dioxide supplementation device includes an interior, soft-shelled bladder for holding the respirating mass of organisms and food, and the external case is a hard-shelled container which receives, protects and masks the soft-shelled bladder. In the hard-shell case variations, single or double bags embodiments may be utilized as the soft bladder, but at a minimum, the device still includes a minimum of one gaseous interchange portal between a body of water and the respirating mass preventing water from reaching the respirating mass.

In general terms, this underwater $CO_2$ production device can be used to enhance the underwater levels of carbon dioxide. The production of $CO_2$ in an underwater environment will be used to benefit an underwater environment by producing carbon dioxide utilized during the photosynthesis cycles of aquatic plants. Aquatic plants, like terrestrial plants, use the process of photosynthesis to draw in carbon, produce chlorophyll and release oxygen.

The device and system are also useful in assisting to luring flying insects towards a water body where they will lay eggs. In this instance, the water body is serving as a trap where any eggs laid will be destroyed. Known means of egg destruction include water circulation. The supplemented carbon dioxide travels into the water body and is emitted into the ambient atmosphere, similar to the human breath, attracts the insects.

Similarly, the device can also be used to create carbon dioxide in an underwater environment to enhance stagnant water to attract water egg laying insects, such as mosquitos. The purposeful attraction activities are a means by which humans can manipulate the insects for the purposes of trapping and killing the insects' eggs and thereby better controlling insect populations which in turn curbs the spread of blood-borne diseases.

The foregoing has outlined, in general, the aspects of the invention and is to serve as an aid to better understanding the more complete detailed description which follows. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

BRIEF DESCRIPTION OF THE DRAWINGS

The following drawings further describe by illustration, the advantages and objects of the present invention. Each drawing is referenced by corresponding figure reference characters within the "DETAILED DESCRIPTION OF THE INVENTION" section to follow.

FIG. 18 is a flow chart describing the technique by which the double bag embodiment with a triple seal is created.

DETAILED DESCRIPTION OF THE INVENTION

Figure 1:
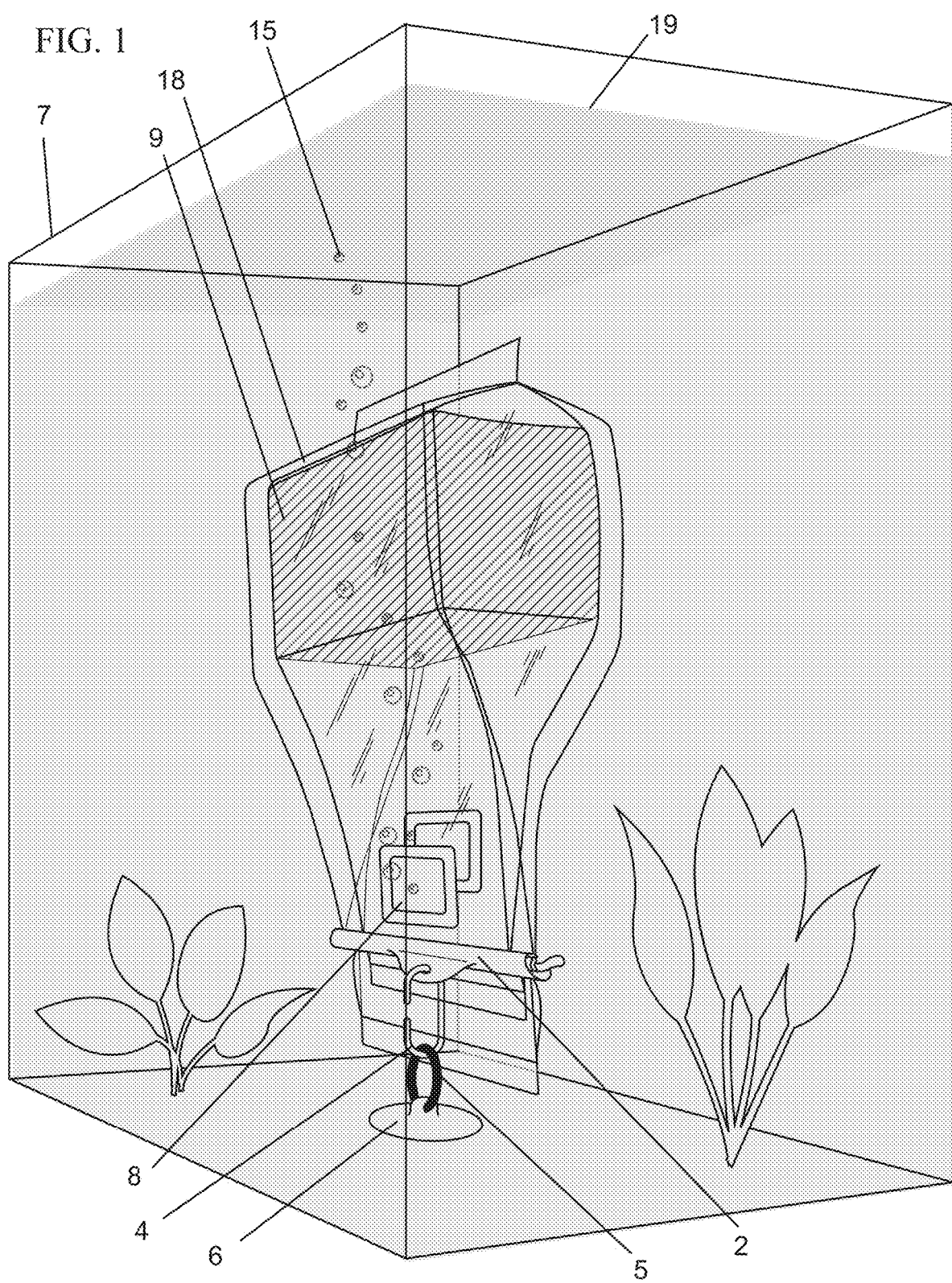
FIG. 1 is a perspective view of a double bag embodiment of the carbon dioxide delivery device and system installed in an aquarium as an example of an underwater environment.
Figure 2:
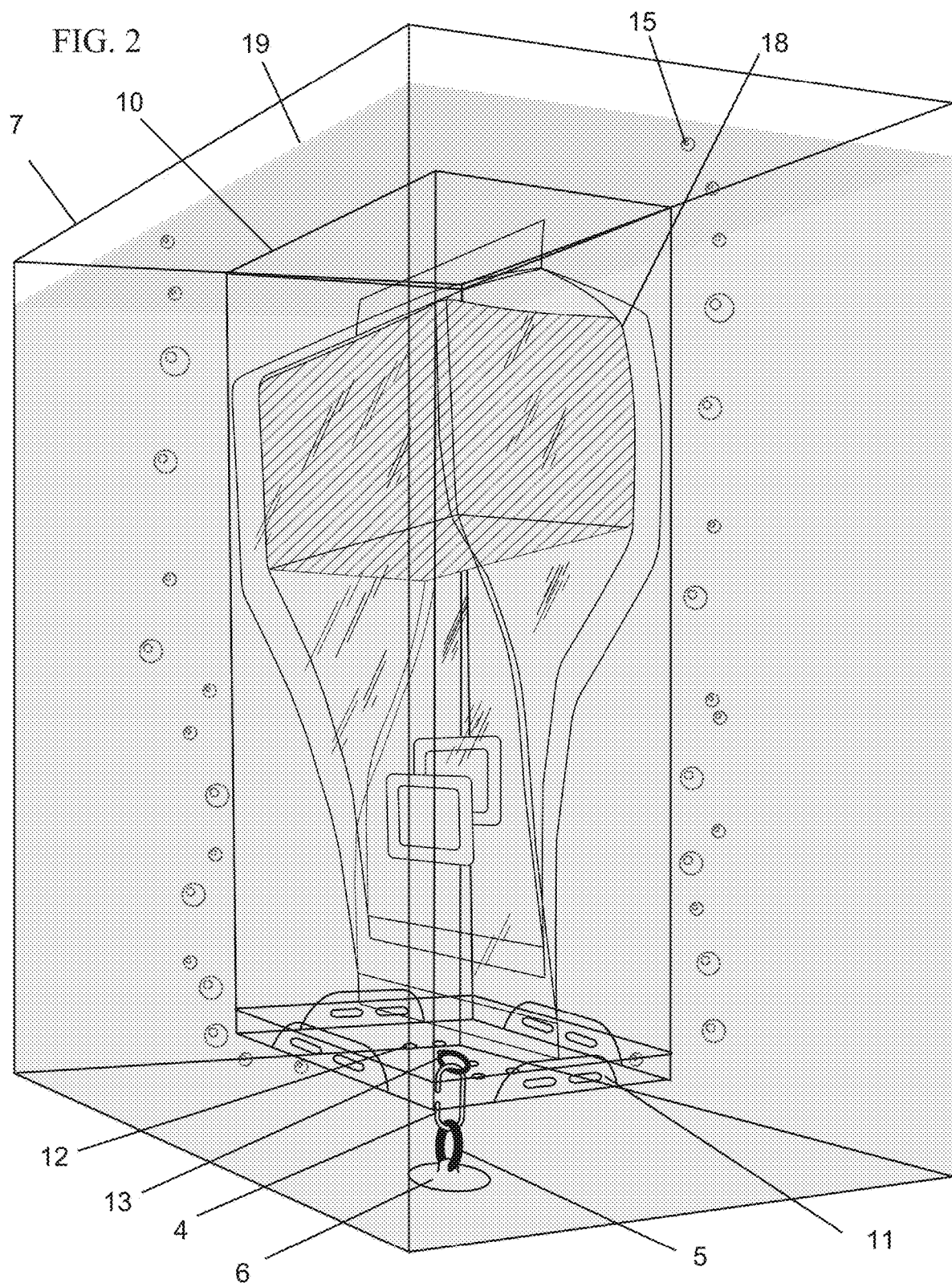
FIG. 2 is a perspective view of the carbon dioxide delivery device and system of the present invention where a double bag soft bladder is inserted into a hard-shell case and installed in an underwater environment.
Figure 3:
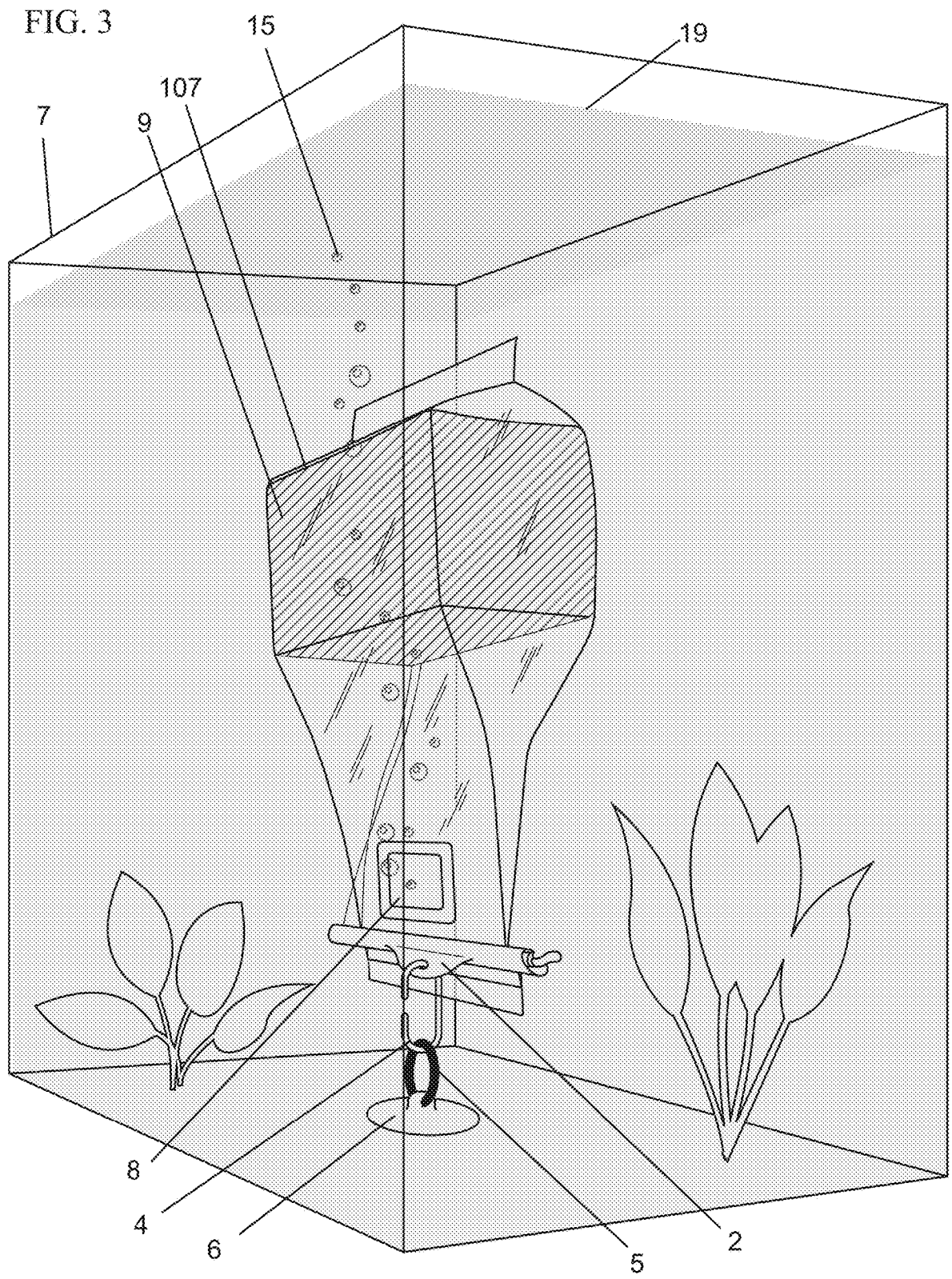
FIG. 3 is a perspective view of a single bag embodiment of the carbon dioxide delivery device and system installed in an aquarium as an example of an underwater environment.

With reference to FIGS. 1, 2, and 3, an underwater carbon dioxide delivery device 1 is shown. The underwater device 1 is comprised of a sealed container 3 with a breather patch 8 and containing a respirating mass 9 which is formed of a mixture of respirating organisms with a food and growth substrate. The breather patch 8 is a gaseous interchange portal which is also referred to herein as a filter or a microporous filter because while it has sufficient filtering capabilities to allow carbon dioxide molecules to leave the sealed container 3 and oxygen molecules to enter the sealed container 3, it also prevents whole water molecules or microbes or other contaminants from entering the sealed container 3. Finally, as illustrated by example in FIGS. 1-3, an attachment mechanism secures the device 1 underwater and the installation of the device according to the present invention creates a system to supplement carbon dioxide in an underwater environment.

Each of FIGS. 1, 2 and 3 illustrates an embodiment of the device 1, according to the present invention, installed in an underwater setting. Water is expressed by the gray shading in the tank reservoir 7 and the water surface 19 indicates the level of the water. In FIG. 1, a double-bag embodiment 18 of the device 1 is installed in the underwater setting. In this illustration, the entire double bag embodiment 18 of the container is shown submerged underwater in the transparent aquarium tank 7. FIG. 2 shows a hard-shell variation of the present invention where a double bag embodiment 18 is inserted into a box 10 with a lid 11. Although not separately illustrated, the hard-shell variation will also be useful in conjunction with the single bag embodiment 107. FIG. 3 illustrates a single bag embodiment 107 of the container where one layer is sufficient to meet the objectives of the present invention for some applications and particularly in tame and contained environments such as the illustrated aquarium. In FIGS. 1-3, bubbles 15 depict the movement of carbon dioxide from the device 1 toward the water surface 19 where it will be expelled to the atmosphere. Plants in the water environment are also portrayed in FIGS. 1 and 3, and, as discussed herein, aquatic plants benefit from the supplementation of carbon dioxide to their environment. The filter 8 or filters of the submerged container 3, permit oxygen to reach the respirating mass 9, which mass is comprised of carbon dioxide expelling organisms (such as mycelia) and a sterilized growth substrate where the organisms grow and reproduce as they consume the food also in the substrate.

With continuing reference to FIGS. 1-3, an example of a means to attach the device 1 underwater is illustrated. The mass 9 of mycelia and substrate will naturally tend to float toward the water surface as illustrated in FIGS. 1 and 3. The combination is clearly floating in the water as the C-hook 4 is illustrated at full extension. Due to the same respirating mass 9 as well as sometimes trapped air, the encased versions of the present invention will also tend to float as depicted in FIG. 2. For these reasons, the container should be secured in the water reservoir 7 in some fashion. Whether employing the single or double bag embodiment, a clip 2 is useful to assist in securing the container 3 to the bottom of the tank 7 in the examples shown. In FIGS. 1 and 3, the clip 2 is attached via a hook 4 to the ring 5 extending from a suction cup 6 which suction cup is attached to the bottom of the aquarium 7. In FIG. 2, the hard-shell 10 and lid 11 are shown with the C-hook 4 and the tie-down accommodation 13 shown suspending the device from the suction cup 6 and its ring 5. When the device is employed in non-aquarium environments, a suction cup 6 may not function and another method of securing the device underwater must be employed. While the container 3 is anchored to or near the bottom of the water reservoir in the illustrated example, in other applications, an arm extending over the side of and into a water reservoir may serve as a means of underwater attachment. In larger reservoirs of water, weights, anchors or screws could be used as a point of attachment. Any means that will hold the device 1, at least up to the level of the breather patch 8, under the surface 19 of the water will suffice. While a C-hook is illustrated, an S-hook may also serve this function as would a coupling such as carabiner or similar device.

Figure 4:
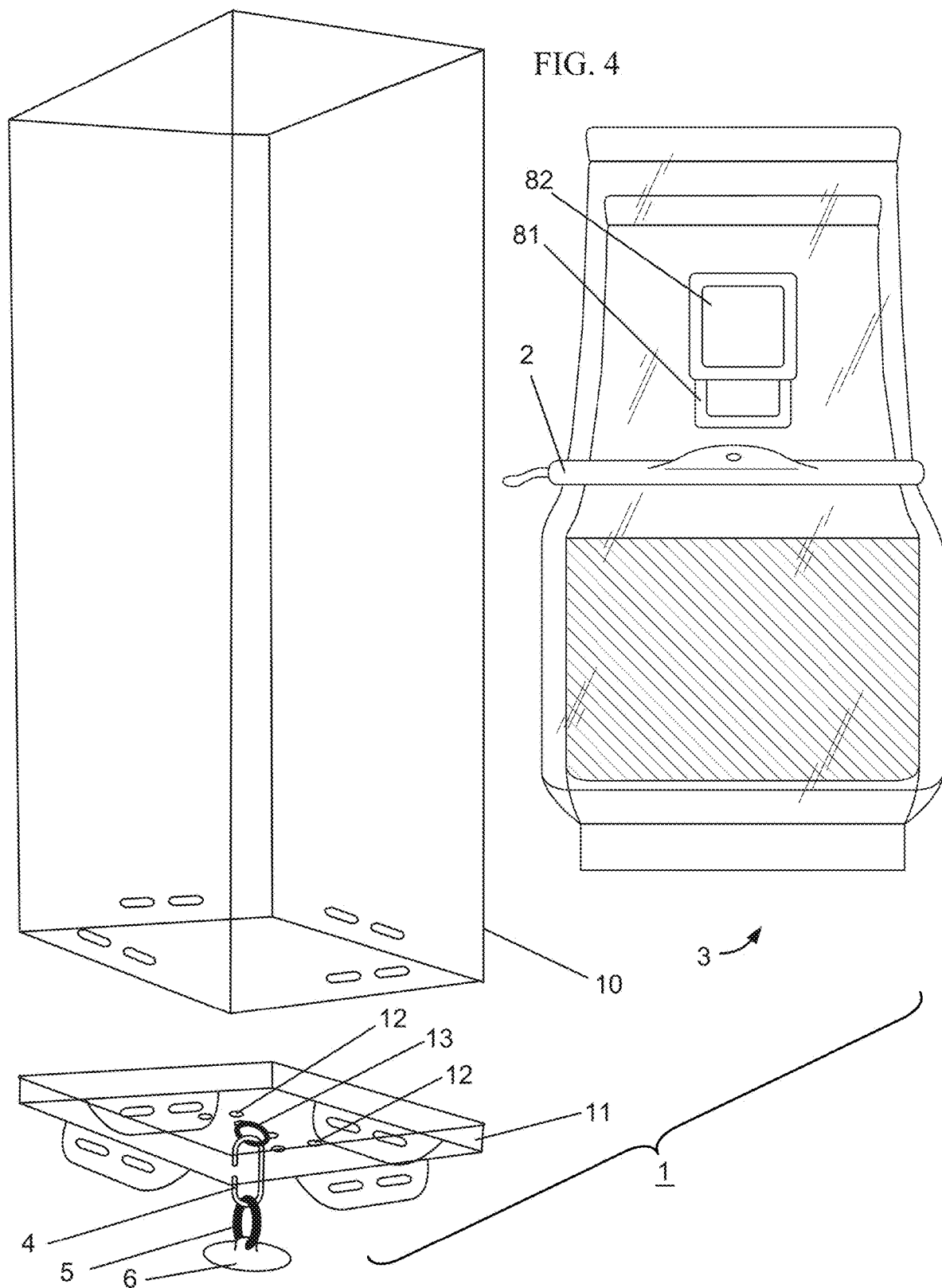
FIG. 4 is a perspective view of a hard-shell case of the present invention separated from its lid and the soft-shell bladder which serves as the container, in this instance a double bag embodiment with a clip is shown.

In FIG. 4, the container 3 of organisms is located next to the hard shell 10 that will receive it. Although a double bag 18 is illustrated in this figure, a single bag 107 may be preferred where the hard case is providing additional support and protection. While this figure illustrates the clip 2 still on the bag, the clip 2 in this embodiment is removed from the bag prior to being inserted into the hard shell 10. With continuing reference to FIG. 4, illustrated below the hard-shell receiver is a lid 11 which lid is used in this embodiment of the device 1 to enclose the container. The lid 11 is optional; however, it serves as containment as well as attachment purposes in this embodiment and could also serve aesthetic objectives for certain applications. With reference to FIGS. 2 and 4, the device may have an outer shell with a lid 11 and if so, the lid 11 must have venting holes 12.

As discussed herein, an external hard shell 10 will be desirable for some applications and in some environments. After preparing a double bag embodiment and acquiring a hard-shell receiver as shown in FIG. 4, the next step to install this embodiment is to remove the delayed activation seal which is illustrated as an exterior clip, also called a clamp 2. Once the clamp 2 is removed, the container is placed within the hard-shell case 10 and the lid 11 is affixed to the case 10 as shown in FIG. 2. In FIG. 2, the internal breather patch 81 and external breather patch 82 are visible through the transparent case but the case could also be opaque. In spite of the snug fit within the case, the container and the breather patches still maintain enough room to allow for the free exchange of oxygen and carbon dioxide through the vented lid 11. FIG. 4 shows the apertures or air holes 12 bored through the lid 11. Other than the holes, the lid 11 closes the bag receiving compartment of the hard case 10. A tie-down accommodation 13 is affixed to the lid 11 of the case and in this instance, it is a rust-resistant ring. In less refined embodiments, the tie-down accommodation 13 of the hard case 10 could be as simple as having two additional holes drilled through the lid and a cable tie (also called a zip tie) threaded through the holes and snipped to fit in a snug loop on the lid 11. With continuing reference to FIG. 4, an addition of a hook 4 is one means by which the tie-down accommodation 13 may be combined to latch or attach the case and the enclosed container at a level below the surface of the water.

Figure 5:
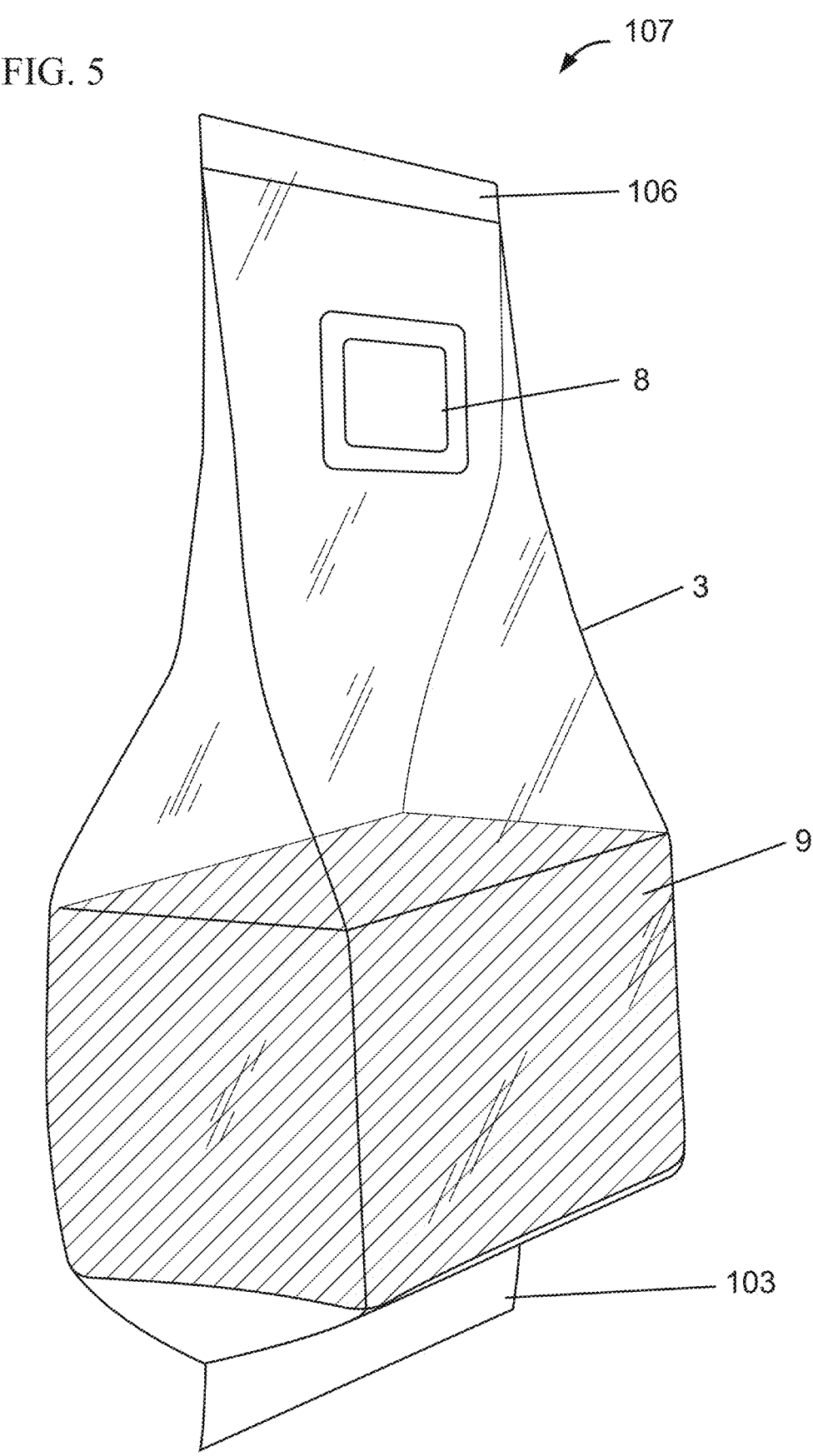
FIG. 5 is a perspective view of an example of a single bag, sealed container of the present invention ready for insertion into a hard shell such as that shown in FIG. 4.

In FIG. 5, the most simple, soft-shelled bladder holding a respirating mass is illustrated. Instead of the double-bag being installed in the hard case as shown in FIG. 4, this soft-shelled bladder could be installed to keep costs down and meet the objectives of the present invention in a simpler manner. The single bag container has a single bottom seal 103 and one top seal 106. The hard-shelled container would receive and protect even the single bag, soft-shelled bladder in most water conditions. As compared with FIG. 4, the single gaseous interchange portal between a body of water and the respirating mass prevents water from reaching the respirating mass. The respirating mass 9 must stay dry to avoid contamination and organism death. Any of the described sealed containers inclusive of the breather patch 8 of the present invention does not permit the contents of the bag to get wet. Water molecules are too large to penetrate the microbial filter 8 of the present invention and therefore are excluded from the interior space of the container 3. While a single bag embodiment 107 will suffice in most environments, the double bag embodiment 18 will provide extra insurance against water penetration due to bag deterioration in adverse water conditions. Each of the bags employed in the double bag embodiment has its own microbial filter 8. When the bags are combined to create the double bag embodiment, the filters are differentiated by their location and are referred to herein as the interior filter 81 and the exterior filter 82 (see, e.g., FIGS. 9 and 15).

Figure 9:
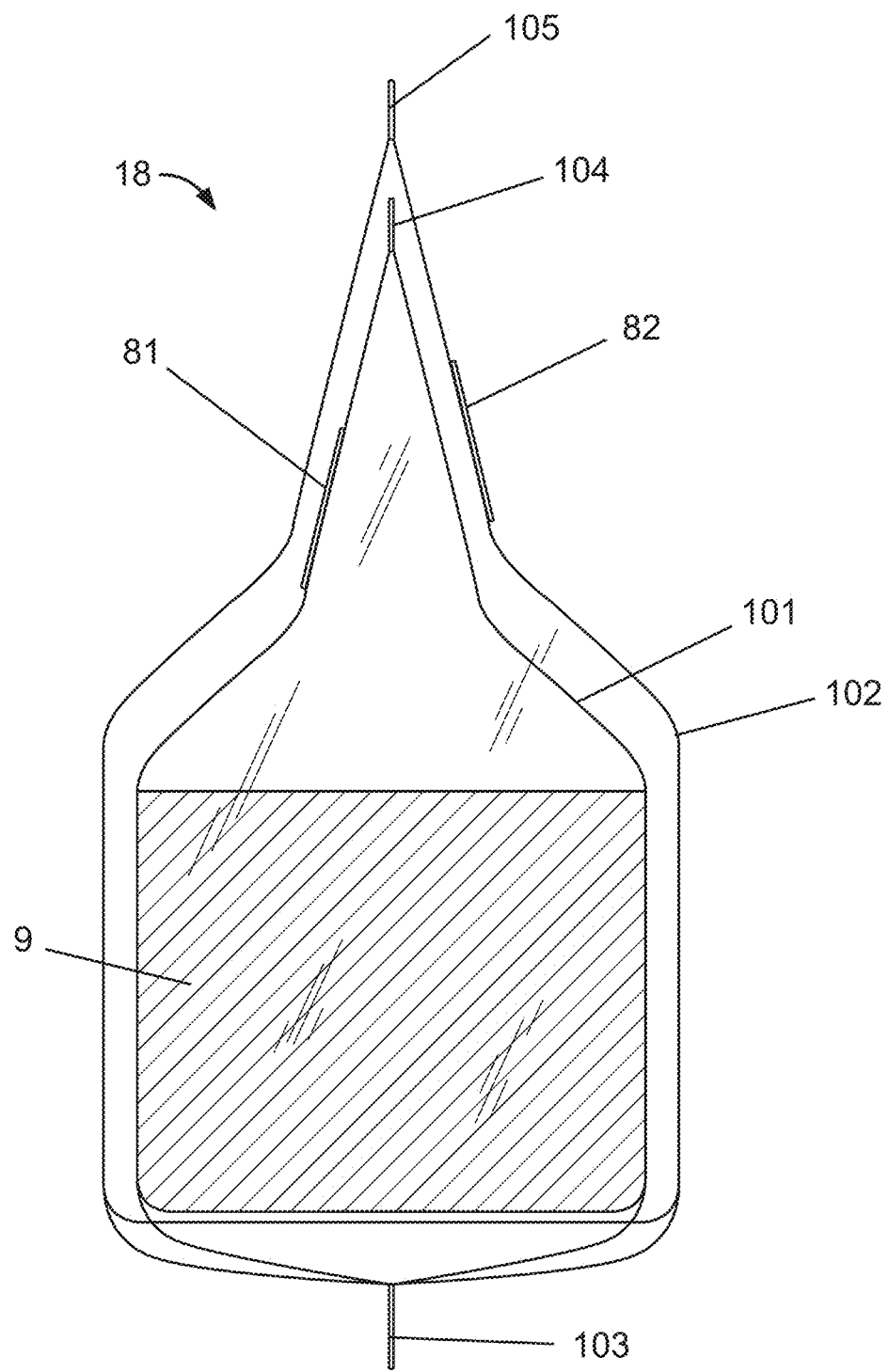
FIG. 9 is a side view of FIG. 8.
Figure 10:
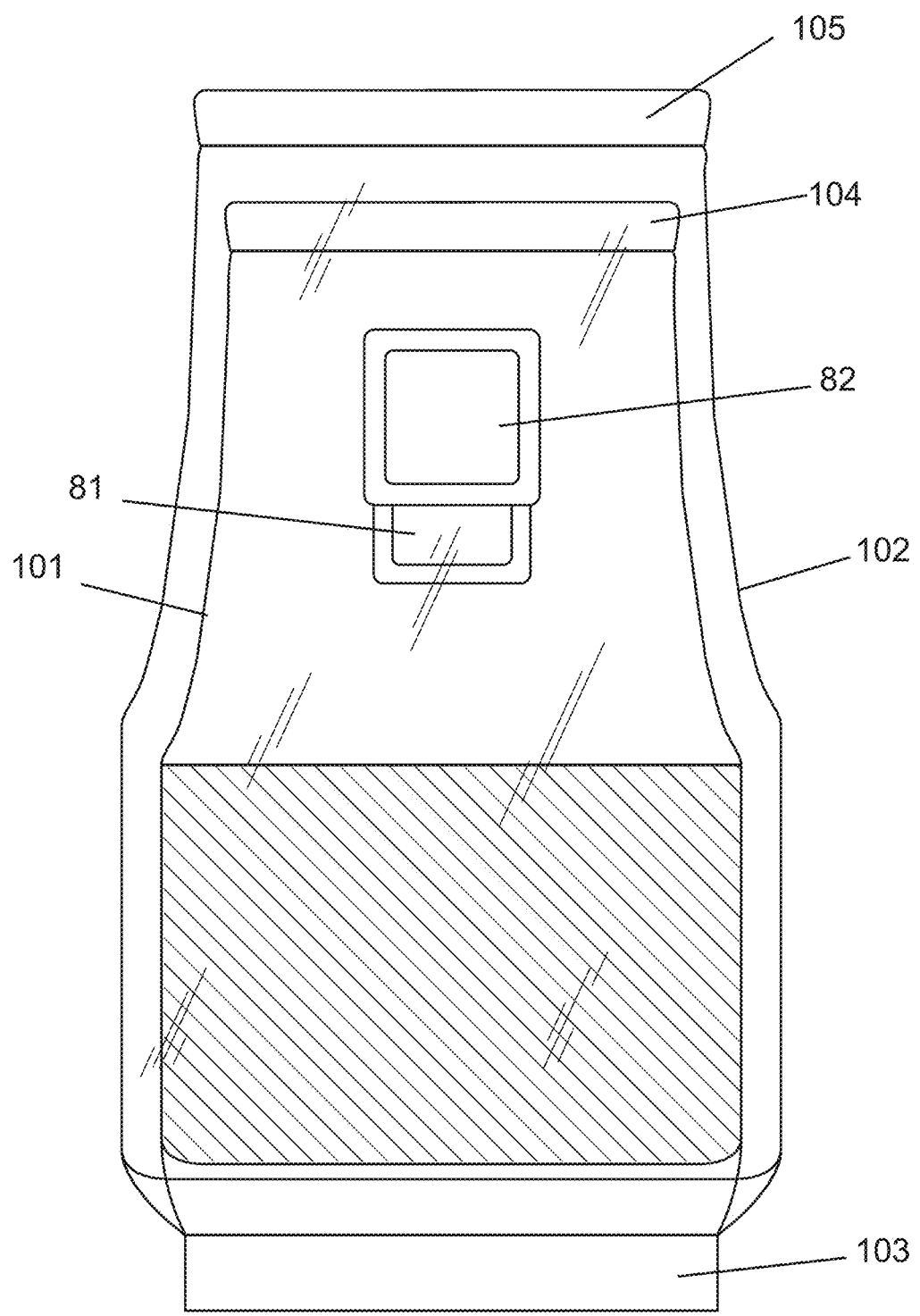
FIG. 10 is a front view of FIG. 8.
Figure 11:
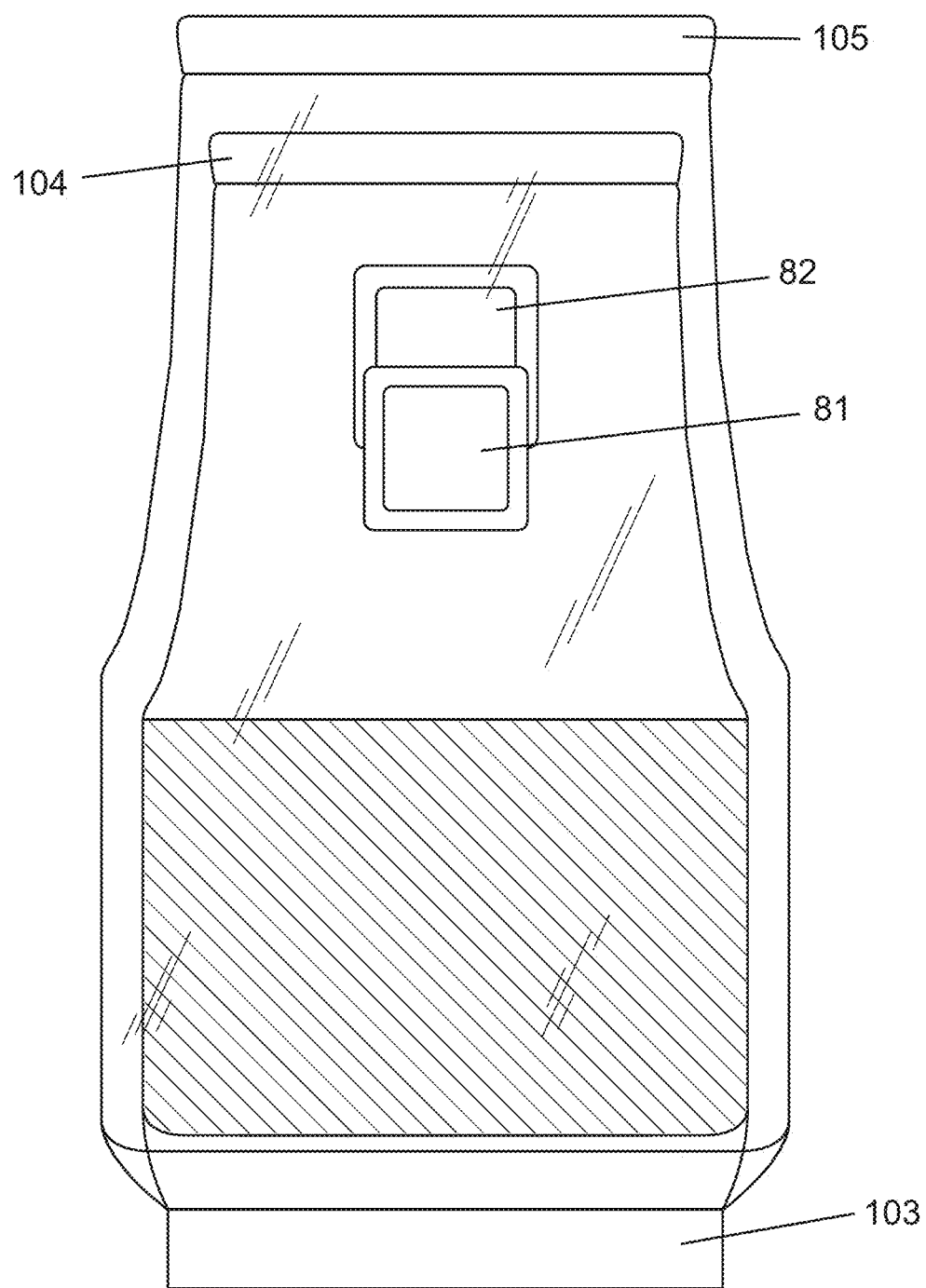
FIG. 11 is a rear view of FIG. 8.
Figure 12:
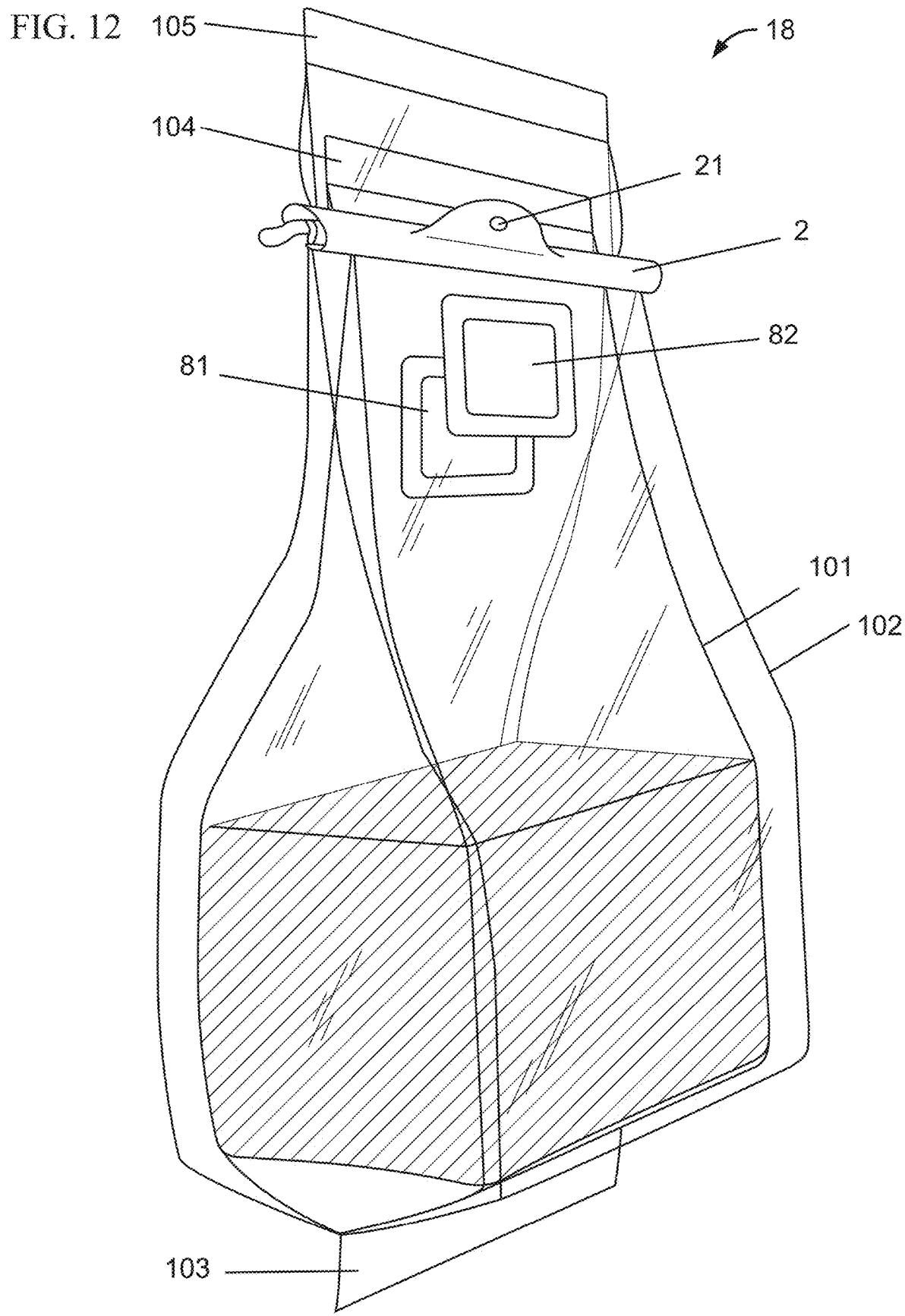
FIG. 12 is a perspective view of an example of a double bag container of the present invention, having a clip attached and ready for use as shown in FIG. 1.
Figure 13:
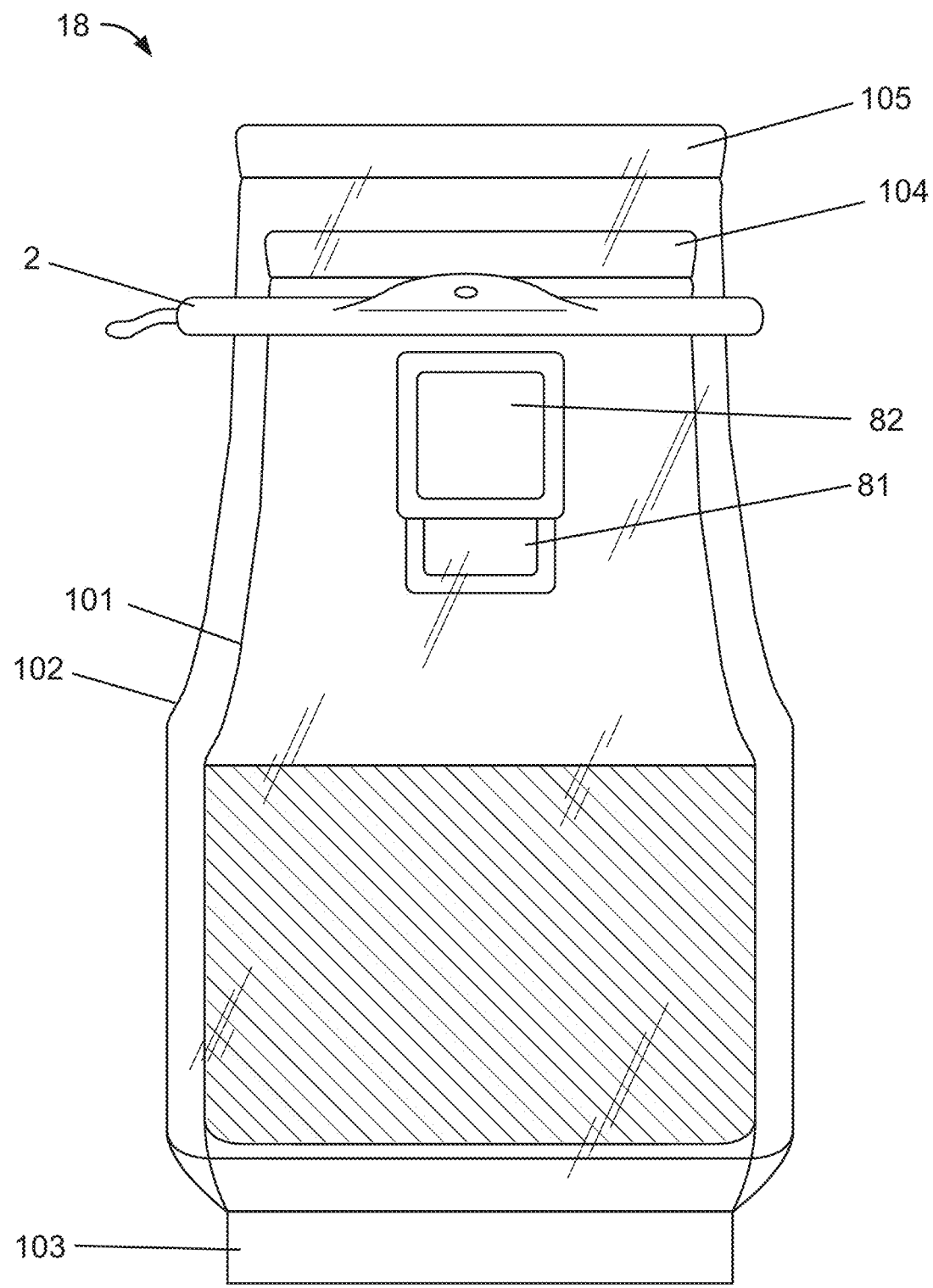
FIG. 13 is a front view of FIG. 12.

Turning to FIGS. 8-11, the double bag embodiment 18 is shown outside of a water environment and without a clip 2. The double bag embodiment 18 is illustrated with a clip 2, and out of the water in FIGS. 12-15. The clip 2 may be used in various positions on the container 3 as shown by the examples of the clip 2 installed at various points over top and below the filters of a double bag embodiment in FIGS. 16 and 17. The breather patch 8 of each container 3 of the present invention is a microbial filter that allows oxygen to enter the device 1 and carbon dioxide to leave device 1. FIGS. 8-17 illustrate an embodiment of the present invention with a double-walled clear plastic bag 18 having two filters 8. When this embodiment is formed according to the methods described below, the breather patch 8 on each bag may be faced in the same or opposite directions. In this version of a double-walled, bag embodiment (also called a double-bag embodiment) 18, the first filter occurs on a first bag 101 which is placed within a second bag 102 which second bag has its own filter. The result is an interior breather patch 81 and an exterior breather patch 82 as best shown in FIGS. 9 and 15. As illustrated in FIGS. 8-17, this version of the device 1 consists of one double-lined, double-filtered bag with three seals. The first seal 103 secures the two bags together with a single, mutual seal at the bottom creating a single receptacle for the respirating mass 9. The next seal 104 closes the first, interior liner bag 101 with the mycelia and the food source/growth substrate sealed therein. The final seal 105 closes the second bag 102 around the first bag 101.

In the present invention, it is preferred that the breather patch be located below the level of the respirating mass 9 when the device is installed as a system for carbon dioxide supplementation. Thus, although the device 1 tends to float when submerged, the attachment mechanism holds the breather patch 8 below the water surface 19. Additionally, the suspension of the respirating mass 9 above the level of the patch 8 enhances the ability of the heavier carbon dioxide molecules to fall or sink and escape through the interior breather patch 81 and then the exterior breather patch 82. The benefits of the device are still realized even if the respirating mass 9 is situated below either or both breather patches 8 in the container as maybe visualized by FIGS. 5-17.

Figure 14:
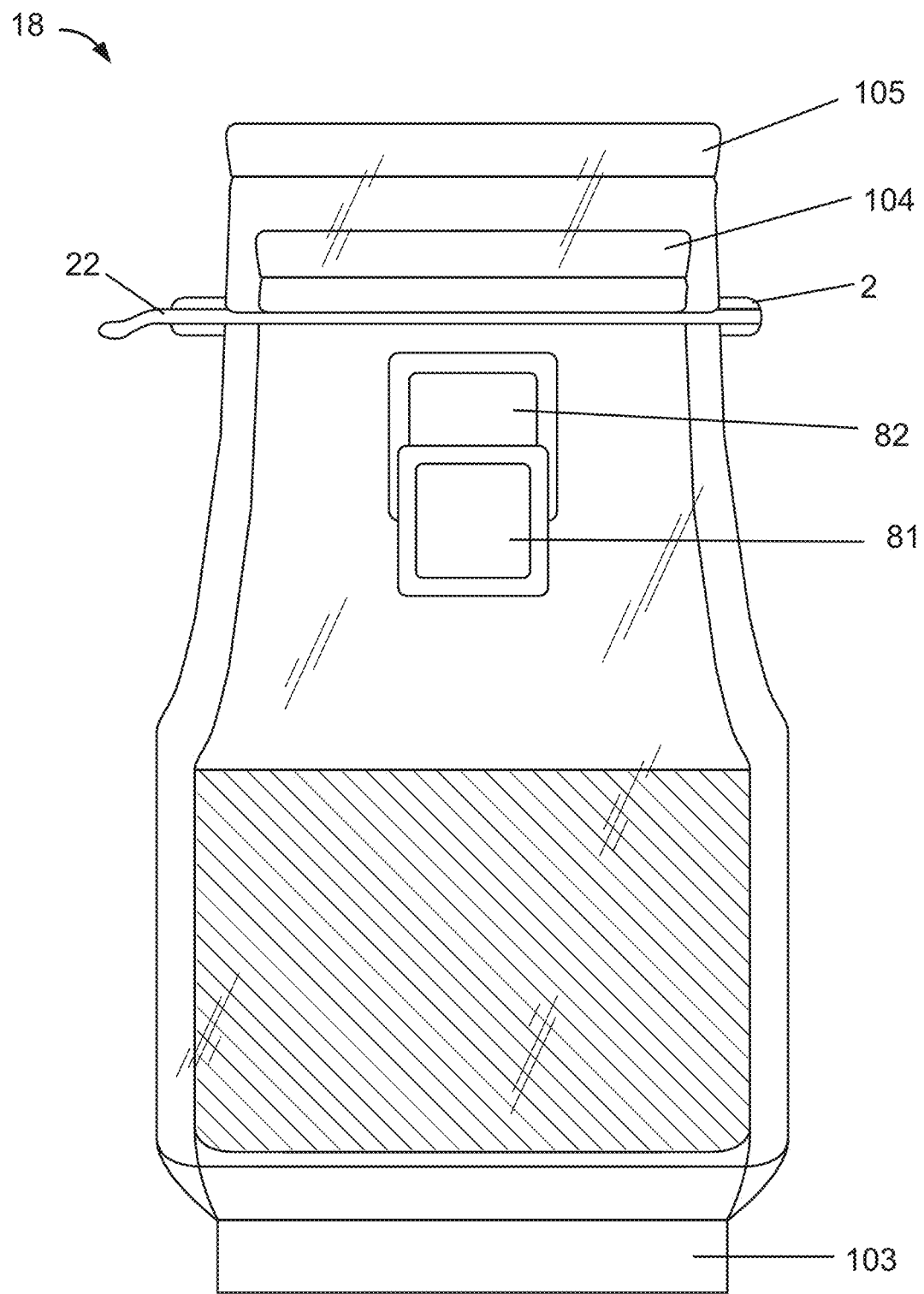
FIG. 14 is a rear view of FIG. 12.
Figure 15:
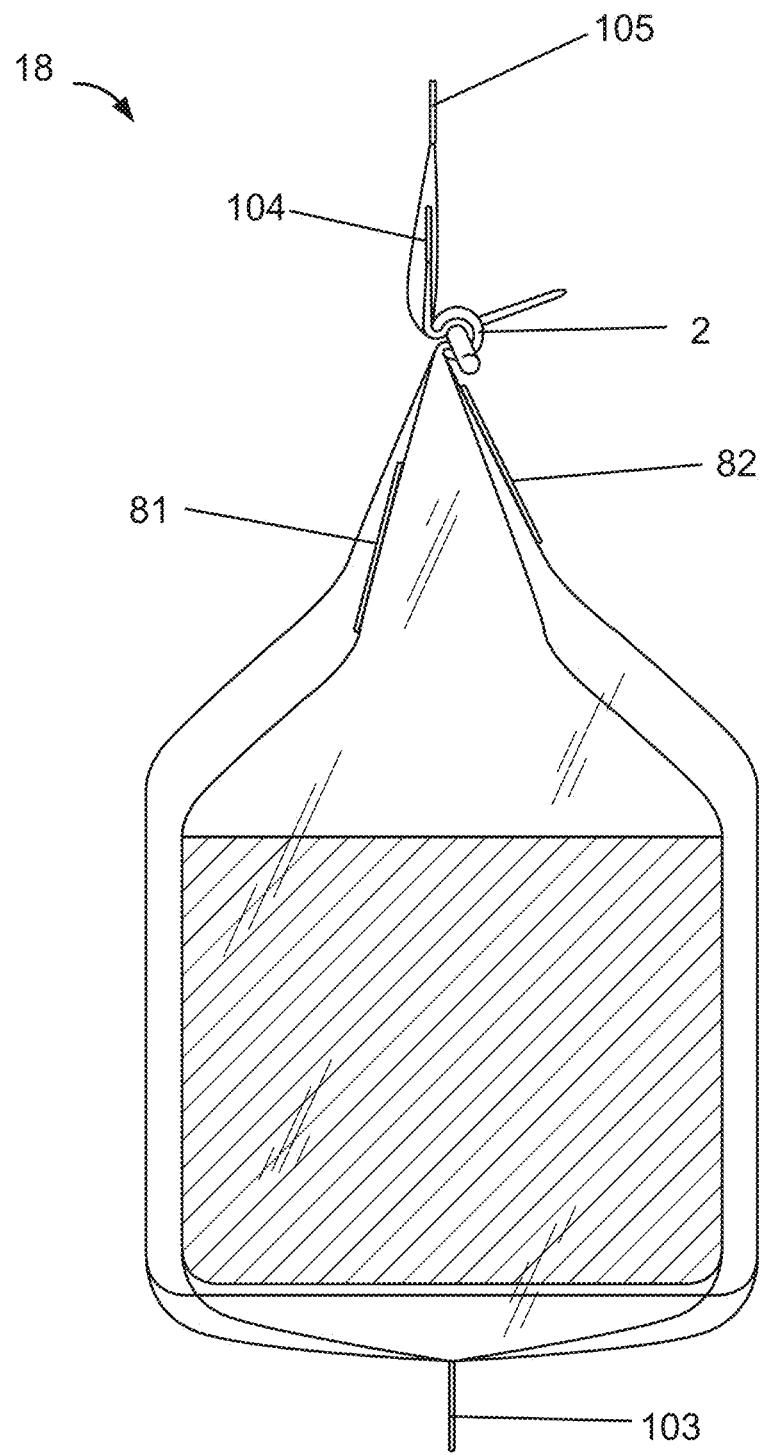
FIG. 15 is a side view of FIG. 12.
Figure 16:
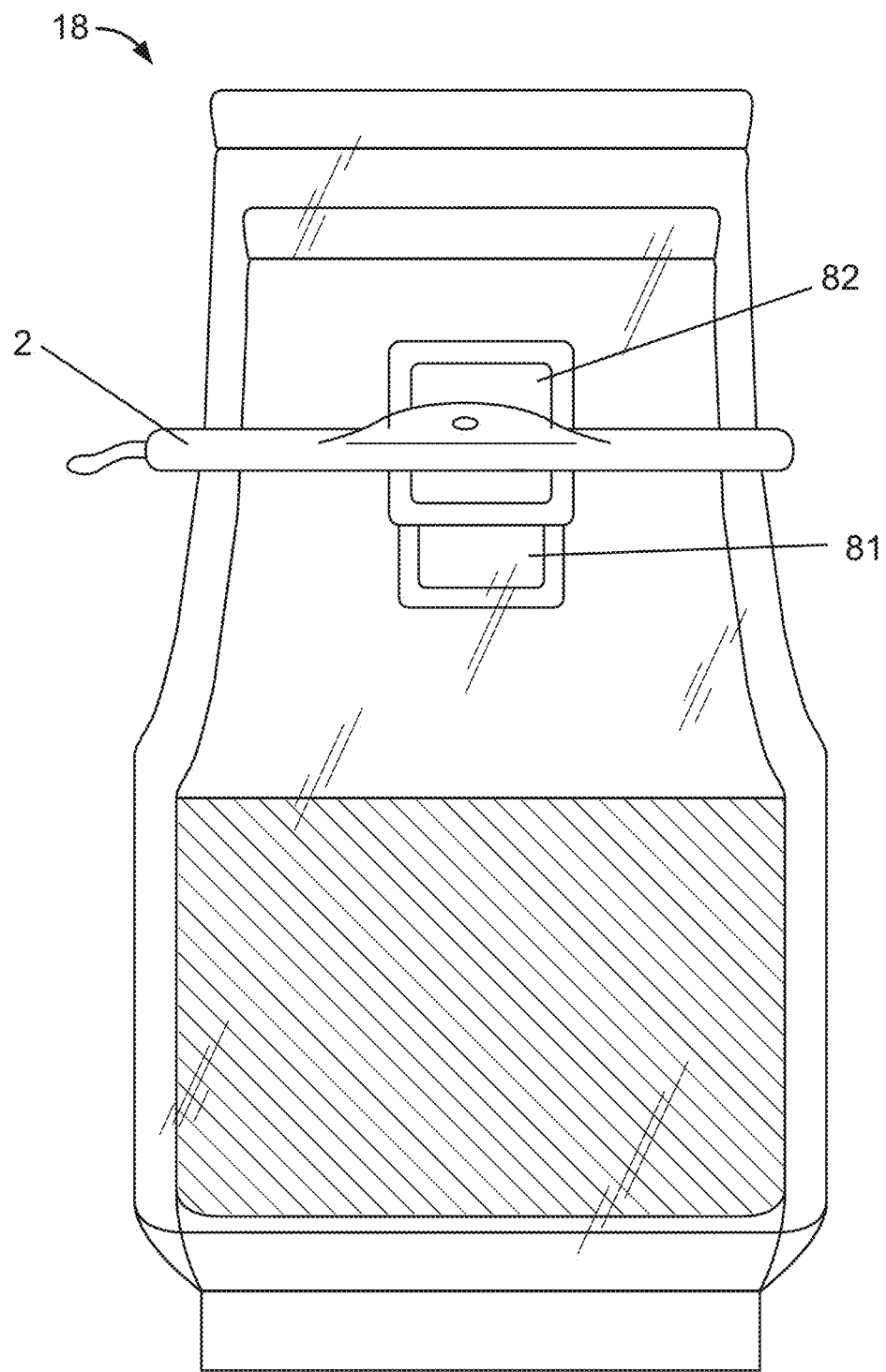
FIG. 16 is a front view of an example of a double bag container of the present invention, having a clip attached over part of the breather patches.
Figure 17:
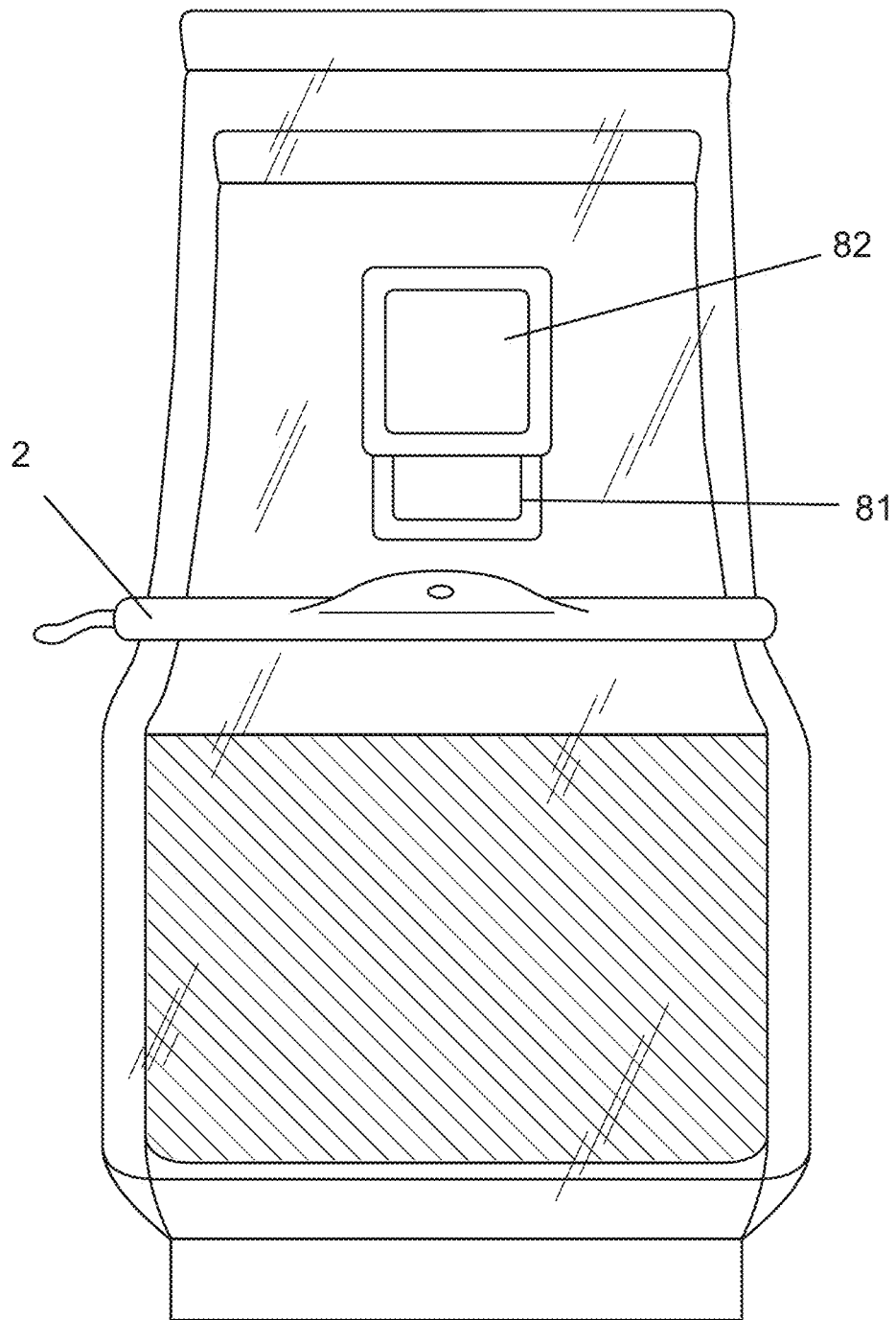
FIG. 17 is a front view of an example of a double bag container of the present invention, having a clip attached below the breather patches.

Turning to FIGS. 6 and 7 and FIGS. 12-17, the device further comprises a clip 2 and this clip includes a hooking hole 21 and a sealing slide clamp 22 (see, e.g., FIG. 14). The clip 2 can be selectively applied to restrict air flow to the organism through the breather patch 8 or to restrict release of $CO_2$. The clip 1 is also removable and formed to fit on the bag container 3 at various locations so that it may be reapplied in various locations, including between the respirating mass 9 and breather patch 8 as shown for the double bag embodiment in FIG. 17 or over the breather patch 8 as shown in FIG. 16.

The use of this underwater carbon dioxide delivery system may comprise steps which include preparing a container having a gaseous exchange portal as a growing environment for mycelia, sealing the container but for the gaseous exchange portal, and placing the device underwater.

A method of supplementing carbon dioxide in an underwater environment is set forth with steps comprising acquiring a sealed container having a combination of a population of respirating organisms, a food source in a growth substrate, and a waterproof gaseous access, and fastening the sealed container underwater. The method finds commercial applications as an attractant in aquatic traps for mosquitoes or insects. The method also finds commercial applications in the underwater environments such aquariums. The method may further comprise the steps of placing the sealed container in a protective housing and/or replacing the sealed container when the respirating organism stops producing carbon dioxide.

In summary, a unique way of supplementing carbon dioxide has been created. Unexpected positive results were experienced when the container's gaseous exchange portal did not allow molecules of water to pass into the sealed organism growing environment. Also unexpected was that the apparent gas exchange gradients permit oxygen into the container where the respirating organism can access oxygen to survive. Survival of the organism results in the exhaling of carbon dioxide from the organism and then from the gaseous exchange portal of the sealed bag. As the carbon dioxide leaves the sealed container it flows into the water reservoir holding the device and is then released into the atmosphere. While the product is utilizing natural processes, those natural processes are being placed in alien environments. Respirating organisms such as mycelia of the preferred embodiment do not typically survive underwater. Food substrates for those organisms do not naturally remain dry when submerged. The present invention is the commercial adaptation and utilization of naturally occurring respiration processes in order to provide a delivery device and system to supplement $CO_2$ in an underwater environment without the need for electricity or the use of compressed $CO_2$. The preferred biological organism is the mycelium of the Turkey tail strain of fungus. It is vital that the gaseous interchange portal allow for the exit of $CO_2$ into the underwater environment. The device may also incorporate a separation device to delay and control the flow of $CO_2$. By separation device, an external seal in the form of a removable clamping clip is intended. The external seal may be accomplished by a specialized clip.

The system requires the device to be held in place through a securing point in the underwater environment. The minimum requirements for the device are described, but in certain instances it will be preferably used in combination with an outer shell housing to protect or aesthetically conceal its placement underwater. The use of the present device and system to supplement carbon dioxide in water will span many industries and applications. It particularly assists in attracting mosquitoes to water where the mosquitoes will lay eggs which can then be destroyed. The carbon dioxide released by the present invention will also supplement $CO_2$ in underwater growing environments like aquariums holding plants or animals and aid in the growth of those plants and may aid in the stabilization of the environment to the benefit of animals.

An external hard shell 10 will be desirable for some applications and in some environments. FIGS. 2 and 4 illustrate such an alternative embodiment of the present invention. A bag with features such as those discussed above is used, but in this alternative embodiment the bag is placed within a hard case 10. The exterior container or capsule aspects of a hard-shell container 10 embodiments will be most desirable for some applications. In certain instances, the capsule may be functional in order to protect the device for longer periods of use in potentially adverse conditions such as rough waters where debris could puncture the bag, inhabited waters where curious animals may tear holes in the bag, or outdoor reservoirs where the bag may be exposed to elements such as the sun or wind. This is particularly true where the single, soft-sided container is enclosing the mycelia which is then placed within the case. In other instances, a decorative case may be employed for aesthetic reasons such as within a fish aquarium. Described in general terms, the invention will comprise a soft-shelled bladder holding a mass of organisms and food, a hard-shelled container receiving and protecting the soft-shelled bladder, a minimum of one gaseous interchange portal between the body of water and the mass of organisms and food, wherein the gaseous interchange portal prevents water and contaminants from reaching the organisms and the food. The gaseous interchange portal preferably occurs on the soft-shelled bladder. In the instance where the bladder has the gaseous interchange portal, then the hard-shelled container needs to have at least one hole to allow the movement of water and air between the soft-shelled bladder and the body of water. At least the portion of the device having the gaseous exchange features must be secured below the surface of the water. In the simplest of embodiments, the hard case functionality could be provided by a bucket placed over top of the bag before the combination is placed in water.

Any organism that expels carbon dioxide and can survive in the conditions imposed by the confines of the present invention may be employed. The organisms used in the ExHale® brand bags are suited to the environmental constraints described herein. Thus, mycelia, specifically mycelia of the white rot variety are preferred. Other organisms which may meet the objectives of the present invention include bacteria with life cycles similar to mycelia.

In general terms, this underwater $CO_2$ production device can be used to enhance the underwater levels of carbon dioxide. The production of $CO_2$ in an underwater environment will be used to benefit an underwater environment by supplementing carbon dioxide utilized during the photosynthesis cycles of aquatic plants. Aquatic plants, like terrestrial plants, use the process of photosynthesis to draw in carbon, produce chlorophyll and release oxygen.

The process to create the double bag embodiment is partially illustrated by the flow chart of FIG. 18. During the preparation procedure, a user:

1) Selects two bags and, if they have an existing bottom seal, removes the bottom seal such as by scissor cutting the seal from each bag.
2) Measures and trims each bag so that the long line of the outer bag 102 is longer than the long line of the inner bag 101.
3) Inserts the inner (shorter) bag 101 inside the other (longer) bag 102 in such a way that the filters 81 & 82 face opposite directions and with care to ensure the pleats of each bag lay smooth with one another and the bottom ends are flush with one another.
4) Heat seals 103 the bottom of the two bags so that when sealed they become connected with one another by a single joint seal.
5) Partially fills the inner bag 101 with substrate where this step and the following steps 6-9 are prepared according to techniques such as those described in U.S. Pat. No. 9,750,196 B2.
6) Steam sterilizes the combined bag unit at 250 degrees Fahrenheit for at least one hour and allows the unit to cool.
7) Inoculates the substrate within the inner lined bag with sterilized pure cultured mycelium or similar organisms.
8) Heat seals 104 the top of inner lined bag 101 above the filter 81.
9) Heat seals 105 the top of outer bag 102 above the filter 82 and above the top seal 104 on the inside bag 101.
10) Allows the mycelium 72 hours to recover from the transfer.
11) Attaches a securing device 2 (clip, hanger, separation seam, or other securing mechanism) (illustrated in FIGS. 6-7 and 12-17).
12) Installs the device 18 in an underwater environment to provide $CO_2$ for aquatic plants or for other purposes such as to attract insects, specifically mosquitoes (illustrated in FIGS. 1-3).

The double bag embodiment 18 such as the one described above meets the objectives of the present invention as it reliably separates the mycelium from the underwater environment and transfers carbon dioxide to an underwater environment as is established by the results of the following test. The initial, ambient carbon dioxide levels in the area immediately adjacent to the water body prior to the placement of the double-bag embodiment 18 below the water was 503 parts per million (ppm). After the bag was placed in accordance with the present invention such as is illustrated in FIG. 1, measurements of the carbon dioxide around the water reservoir were taken over a 48-hour period. Later measurements at the same location showed that the carbon dioxide output peaked at around 667 ppm at around 30 hours and then ended at around 640 ppm after 48 hours.

Finally, in the most basic version of encasement for the present invention, the organisms producing carbon dioxide in the sealed, breather-patch-equipped container are placed under the water level and within a dome of air created when a bucket, serving as the hard case 10 (in some instances opaque instead of transparent), is inverted over the container and then submerged below water level. A bucket will contain the sealed, breather-patch-equipped container 3 inverted into a reservoir 7 as shown in FIG. 2. In some embodiments, the hard case does not have a lid so there is no need for additional air holes but only some manner to secure the device under the water.

Testing has shown that the performance of the bag as disclosed in the prior applications is not adversely impacted by placement underwater except that the ideal ranges of $CO_2$ supplementation and thus the life of the mycelia may be reduced from an average of 6 months to an average of 3-5 months. The positive supplementation of $CO_2$ to a body of water or reservoir for a period of 3-5 months will cover the entire mosquito-breeding season in most climates.

Each embodiment of the present invention provides an all-natural solution that does not require regulators or the use of electricity. The present invention provides $CO_2$ for the entire mosquito season, requires no mixing or maintenance nor does it pose any fire danger.

The disclosure has focused on the use of this device underwater, but the device could be implemented in any artificial growing environments, including space. When extraterrestrial gardens or water reservoirs will need carbon dioxide supplementation, the present invention should be implemented.

Testing of the device showed increased levels of $CO_2$ in both underwater concentrations as well atmospheric concentrations above the surface of the water. For the tests performed, the following parameters were implemented: a 20 gallon receptacle was used with a 10 gallon water reservoir inside. A $CO_2$ meter was placed outside the water reservoir, but inside the 20 gallon receptacle. A sealed lid was then placed on top of the 20 gallon receptacle to measure the $CO_2$ that was produced by the bag and released out of the water. Initial ambient atmospheric $CO_2$ levels were measured and documented by hand before introducing the device remained fairly steady, within around +/−20 ppm. While ambient atmospheric $CO_2$ levels are known to typically range from 400-450 ppm, initial readings before beginning treatment in each test were between 462 parts per million (ppm) and 484 ppm. Initial ambient levels of aquatic $CO_2$ ($CO_2$ in the water) were between 3-5 parts per million (ppm). Repeated testing after 24 hours of placing the device underwater in an aquarium showed levels of aquatic $CO_2$ to be between 10-20 ppm. Repeated tests show the $CO_2$ produced by the device and released from the water into the atmosphere resulted in increased levels of atmospheric $CO_2$ to 550-1000 ppm. The tests proved that the $CO_2$ was exiting the filter and going into solution and then being released back into the atmosphere.

When using the present invention for underwater growing environments for aquatic plants or in such environments which will also hold fish or other sea life, the levels of other compounds and the effects on pH must be carefully monitored. Water with high KH (carbonate hardness) is able to neutralize a lot more acid and will resist a drop in pH. The pH will remain more controlled when the KH is in the range of 160-180 ppm. Tests were conducted to ensure that the supplementation of $CO_2$ would not adversely impact these carefully balanced living environments. These tests support the hypothesis that supplementing $CO_2$ in controlled environments will show benefits to the system without adversely affecting other growing factors.

In the next phase of testing, the experiment set up had two aquariums arranged with identical water and plant content. The carbon dioxide underwater delivery device and supplementation system of the present invention was only installed in one tank. Over time, this test measured the impact of the $CO_2$ supplementation on the growth of aquatic plants, in particular a water onion. In this experiment, an aquatic plant (a water onion bulb) was planted in a standard underwater growing medium formula and placed underwater—one tank holding a water onion was given only standard aquarium ambient air supplementation of 0.4-0.7 BPS. Upon visible germination, daily growth was tracked by photographic comparisons. Day 1 growth of the water onion was compared. The growth of the water onion when the plant was placed in water treated by the present invention appeared more robust than the onion without supplementation by the present invention. The next measurements for this test were taken at Day 4 after visible growth. The growth of the water onion at Day 4 when continuing to be grown in water treated by the present invention continued to be more robust than the growth of the plant in the unsupplemented water. The results of this test after 7 days of growing in the respective environments showed that the growth of the onion plant in the treated water was more robust than the onion plant in the unsupplemented water.

Figure 6:
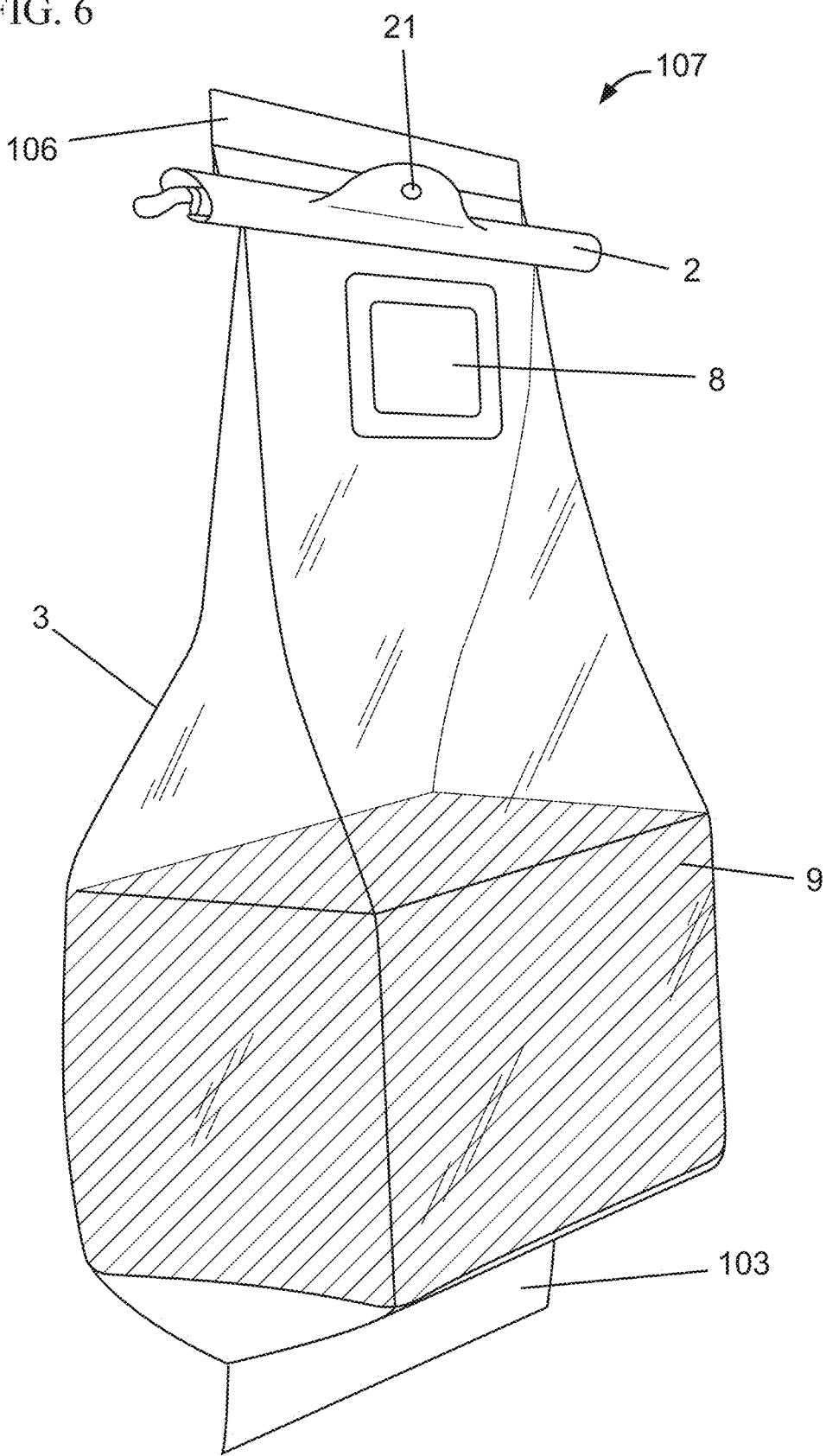
FIG. 6 is a perspective view of an example of a single bag, sealed container of the present invention, having a clip attached and ready for use as shown in FIG. 3.
Figure 7:
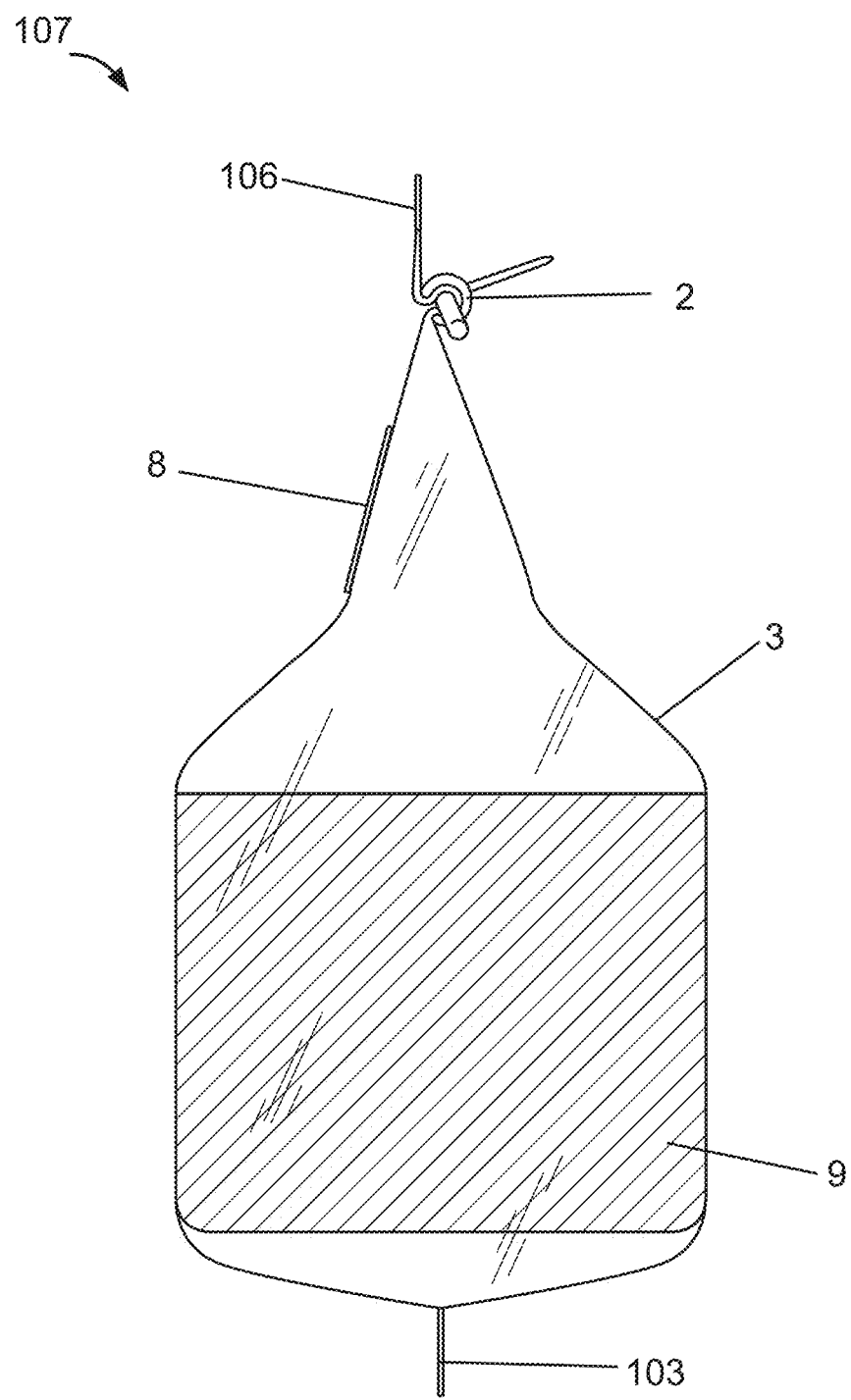
FIG. 7 is a side view of an example of a single bag, sealed container of the present invention, having a clip attached and ready for use as shown in FIG. 3.
Figure 8:
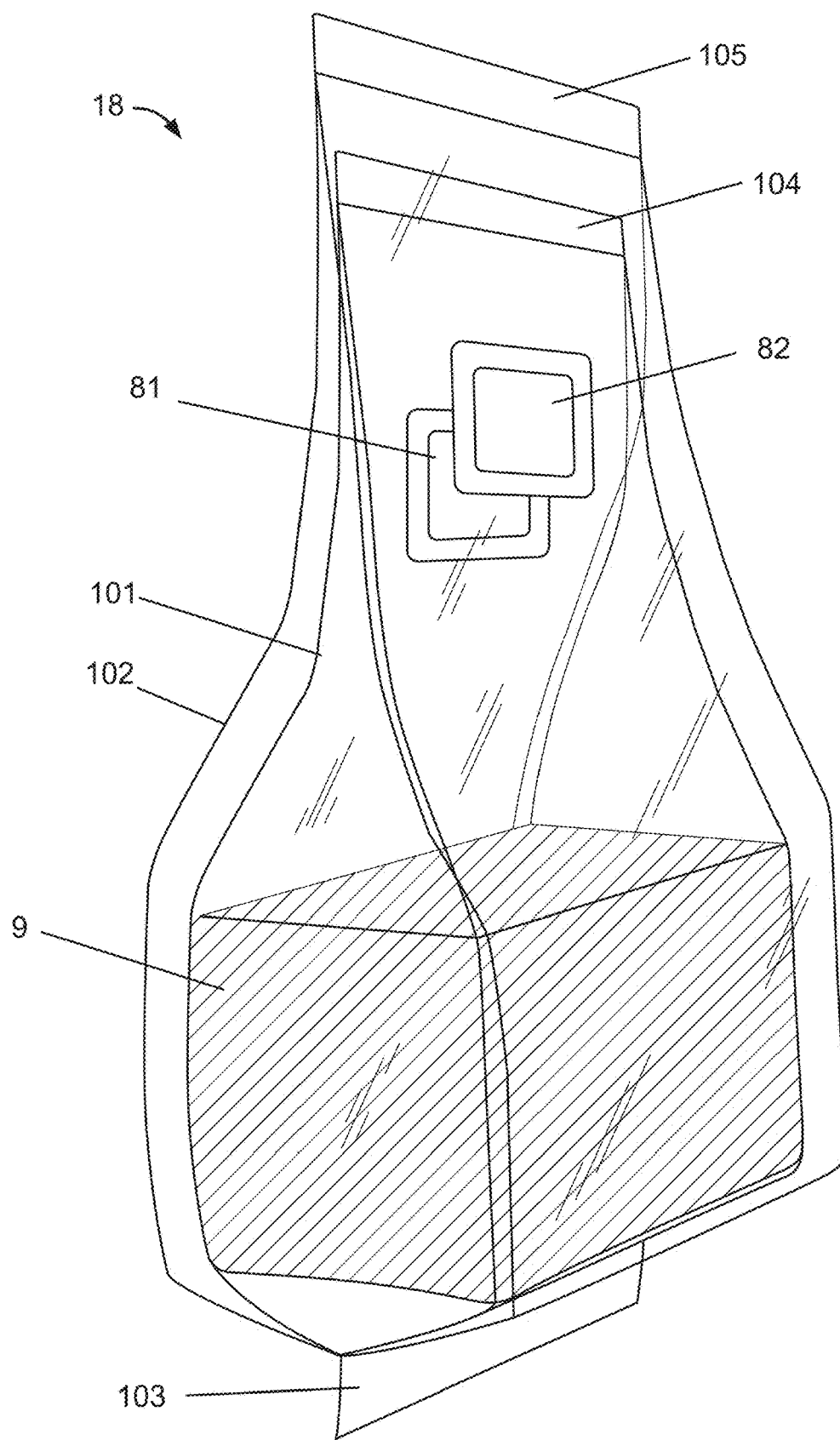
FIG. 8 is a perspective view of an example of a double bag container of the present invention ready for insertion into a hard shell such as that shown in FIG. 2.

The double-bag implementation of the present invention is shown in the water in FIG. 1. In FIG. 3, the clip 2 is visible as is the double-bag container 18. The white squares above the clip 2 are the breather patches 8. Above the breather patches is a mass. That mass comprises an organism that expels carbon dioxide. It is preferred that the ExHale® brand bag with delayed activation shown in FIGS. 5-7 is used for this invention. The ExHale® brand bag has a special mixture of mycelia and a food substrate for that mycelia. In ExHale® brand bags the mycelia have all of the food needed to feed and live for up to 6 months. In addition to food, mycelia require oxygen to survive. In demonstrating the efficiency and preparation of this device, it has been established that when this device is placed under the water, the mycelia are able to access the oxygen needed to survive through the breather patch of the present invention. The mycelial respiration is assisted if the water is circulated at least once a day.

The inventors claim a method of supplementing carbon dioxide in an underwater environment. Wherein the claimed method comprises the steps of acquiring a sealed container having a combination of respirating organism, food source, and a waterproof gaseous access and then fastening the sealed container underwater. Once secured underwater, the method further calls for the use of the fastened container in an underwater environment that is a mosquito trap or an aquarium. According to the methods, the sealed container can be placed in a protective housing. Then, as the respirating organisms stop producing carbon dioxide they can be replaced, and the container or shell reused.

The inventors also claim an underwater carbon dioxide delivery system and supplementation system consistent with the objectives of the present invention. The novel system comprises the preparation of a container as a growing environment for mycelia where the container has a gaseous exchange portal and that container is sealed but for the gaseous exchange portal. That sealed container is then installed underwater in a manner to supply and supplement carbon dioxide to that underwater environment.

It is further intended that any other embodiments of the present invention which result from any changes in application or method of use or operation, method of manufacture, shape, size, or material which are not specified within the detailed written description or illustrations contained herein and yet are considered apparent or obvious to one skilled in the art, are within the scope of the present invention.

What is claimed is:

1. An underwater carbon dioxide delivery device comprising:
    a sealed container having a bottom area,
    an organism placed within the sealed container in the bottom area,
    a food substrate for feeding the organism mixed with the organism in the bottom area of the sealed container,
    a breather patch located on the sealed container,
        the breather patch having sufficient filtering capabilities to allow carbon dioxide molecules to leave the sealed container and oxygen molecules to enter the sealed container,
        the breather patch having sufficient filter capabilities to prevent whole water molecules from entering the sealed container,
    an attachment mechanism,
    wherein the attachment mechanism is configured to secure the device in an underwater environment such that the bottom area floats underwater and above the attachment mechanism.

2. The device of claim 1, wherein the device further comprises a clip.

3. The device of claim 2, wherein the clip serves as a selectively applied sealing device to restrict air flow to the organism through the breather patch.

4. The device of claim 2, wherein the clip cooperates with the attachment mechanism.

5. The device of claim 1, wherein the sealed container comprises a single bag.

6. The device of claim 1, wherein the sealed container comprises a first bag layer and a second bag layer.

7. The device of claim 1, wherein the sealed container is surrounded by a water-resistant case.

8. The device of claim 7, wherein the water-resistant case further comprises venting holes.

9. An underwater carbon dioxide delivery device comprising:
    a floating sealed container,
    an organism placed within the floating sealed container,
    a food substrate for feeding the organism mixed with the organism in the floating sealed container,
    a water-resistant, gas-permeable breather patch located on the floating sealed container,
    an attachment mechanism located on the floating sealed container.

10. The device of claim 9, wherein the device further comprises a clip.

11. The device of claim 9, wherein the floating sealed container comprises a first bag layer and a second bag layer.

12. The device of claim 11, wherein the floating sealed container comprises an external case.

13. The device of claim 9, wherein the floating sealed container is surrounded by a water-resistant case.

14. The device of claim 13, wherein the water-resistant case further comprises venting holes.

* * * * *